INVENTORS
FRANK J. PILIA
LLOYD W. YOUNG
STANLEY H. ROYER

United States Patent Office 2,817,745
Patented Dec. 24, 1957

2,817,745

TUBE BUTT WELDING

Frank J. Pilia, West Orange, and Lloyd W. Young and Stanley H. Royer, Elizabeth, N. J., assignors to Union Carbide Corporation, a corporation of New York Application December 19, 1955, Serial No. 553,868

7 Claims. (Cl. 219—61)

This invention relates to tube butt welding, and more particularly to inert gas shielded electric arc welding with a tungsten or other non-consumable electrode for joining tubes in end-to-end relation and to a torch machine for operating circumferentially on cylindrical and tubular workpieces.

In butt welding aluminum tubing of diameters of one-eight to one-half inch and of wall thicknesses from 0.025 to 0.060 inch, it has been found that the heat conductivity is such that the heat transfer rate has exceeded the welding speed, that is, the heat of the welding progresses around the tube faster than the weld when using usual welding speeds. Such heat build-up condition makes it necessary to change the welding speed or the welding current during the operation in order to produce a uniform weld. We have discovered that if the welding speed can be brought up to exceed the heat transfer rate, for example to exceed 100 inches per minute, the welding puddle can go around the tube faster than the rate of heat conduction, so that uniform welding is produced at constant speed and constant voltage and current. The welding speed can go up to 285 inches per minute, limited only by the 60 cycle power supply, and with higher frequency power still higher speeds can be employed. A one-quarter inch diameter tube can be welded in one-fifth of a second.

When the tubes to be joined are free to rotate, the butt welding is readily accomplished by applying a relatively stationary torch to the rotating abutting ends. But when one or both tube ends to be joined are already connected to relatively bulky parts, rotation of the tube ends is not feasible. For example, in the refrigeration industry it is desirable to butt weld one tube end which is the terminal of a coil or other cooling unit, to another tube end which is the terminal of a compressor or other refrigerating unit. These units are too unwieldy to support and rotate in precision spacing with respect to a stationary torch.

It is, therefore, an object of the present invention to provide butt welding in which the work is stationary and the welding torch is revolved around the outside of the abutting tube ends. Other objects are to render such welding automatic, to increase the speed of welding, and to provide a quick return for the idling stroke of the torch.

It is a further object to provide a method of welding in which the welding speed can be kept constant at such values that avoids difficulties due to heat build-up in the workpiece; and to provide a machine for revolving a gas fed torch circumferentially around cylindrical work such as tube ends held in abutted alignment.

According to the present invention, tube butt welding is preferably accomplished by inert gas shielded electric arc welding with a non-consumable electrode by holding the tube ends to be welded in abutting end-to-end relation, striking an arc between a non-consumable electrode and said aligned abutting tube ends to form a weld puddle, shielding the arc and weld puddle with a stream containing essentially inert gas, and rotating said non-consumable electrode, arc, weld puddle and shielding gas stream around the abutting tube ends at a rate exceeding the rate of heat conduction, for example from 100 to more than 285 inches per minute. Preferably the arc is struck after the torch is in motion, is maintained for one revolution to complete the weld and preferably for about another quarter revolution to decrease the size of the weld puddle. The rotation of the torch is continued to decelerate the mechanism in a total of about two revolutions.

It has been discovered that the heat build-up when butt welding small diameter tubes changes appreciably when the welding speed is increased to about 100 inches per minute. Then the heat build-up or rate of heat conduction around the tube seems to remain constant and with welding speeds in excess of 100 inches per minute it is possible to make quality welds around such tubes with both constant travel speed and power or heat input. When using a 60 cycle A. C. arc welding power supply, the welding speed can be increased to about 285 inches per minute. At greater speeds, the effect of the 60 cycle pulses tends to become noticeable and detrimental. Still higher speeds could be used with A. C. power supply at higher frequencies.

Figure 1:
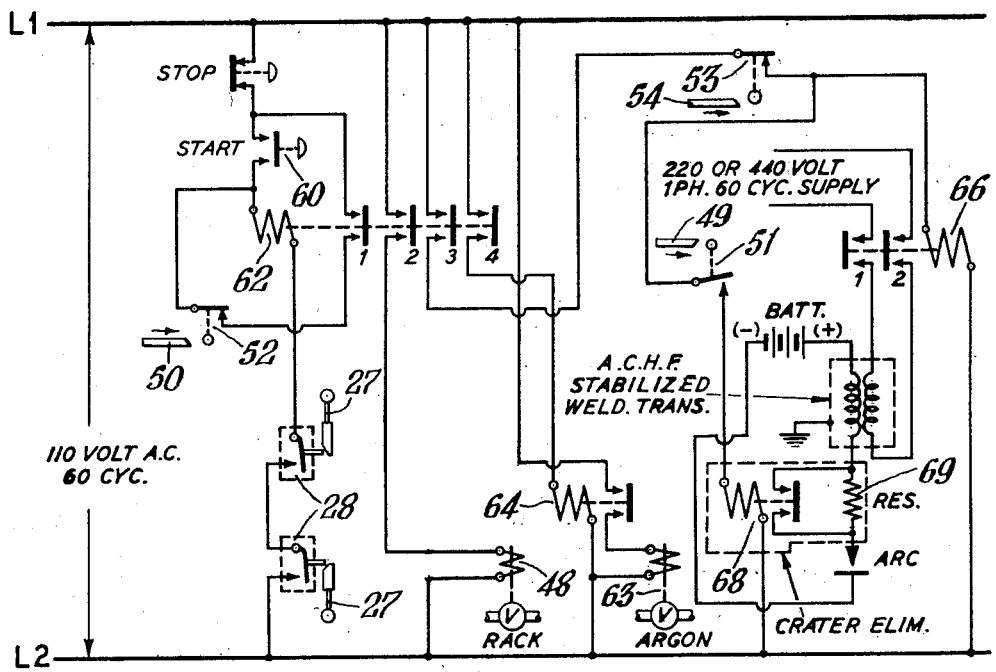
Fig. 1 is a schematic electrical diagram of the machine.

The preferred embodiment shown in the drawing is particularly adapted for use by the refrigerator industry, and the welding is done by an inert gas shielded arc welding torch, preferably having a tungsten electrode shielded by argon gas. The machine is fully automatic in the sense that after the tube parts are manually clamped in position the entire welding sequence is initiated and completed merely by depressing the start pushbutton. The welded tubes are then released by manually operating the upper and lower clamping valves. It is contemplated that the machine could also be used for cutting, brazing and heat treating operations with suitable torches.

The machine operates on tubing of various sizes including sizes ranging from quarter to half inch diameters, and the welding time is measured in fractions of a second.

The machine comprises upper and lower tube clamp assemblies, an oil and air operated cylinder rack and pinion assembly, a torch carrier assembly, and control mechanism.

Figure 2:
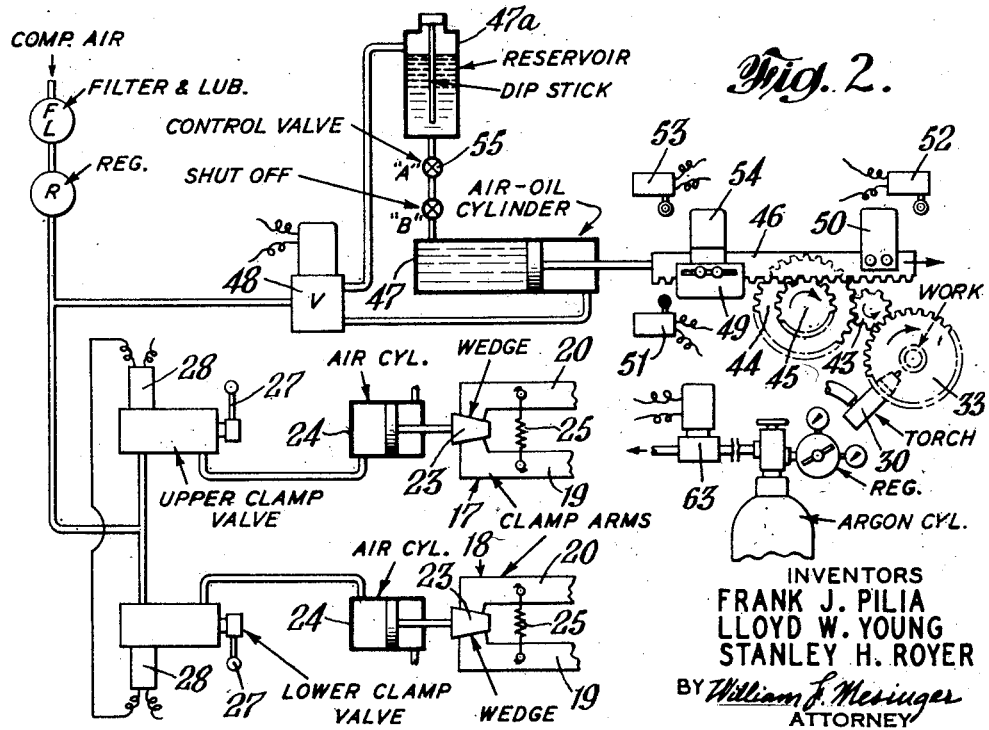
Fig. 2 is a schematic layout of the pneumatic, electrical control system of the machine.

As shown in Fig. 2, each tube clamp comprises clamp arms 19 and 20 terminating in coacting jaws. A wedge 23 driven by an air cylinder 24 enters between the rear ends of the clamp arms to urge the jaws into closed position to grip the tubes. A spring 25 spreads the jaws when the wedge 23 is withdrawn. The air cylinder of each tube clamp is controlled manually by a valve having a handle 27, which also operates an electrical interlock 28 there being upper and lower clamp valve handles 27.

The welding torch 30 is shown in Fig. 2 as carried by a drive gear 33. The torch driving gear 33 is driven by a pinion 43 driven by a gear 44 rigid with a smaller gear or pinion 45. The pinion 45 is driven by a rack 46 on the piston rod of an air and oil cylinder 47 the oil being on the head side of the piston.

The rack-drive air and oil cylinder 47 is started and stopped by a solenoid valve 48, in turn energized by a start push button 60. The rack is driven by oil pressure for the drive stroke, and returned by air pressure. The oil end of the cylinder 47 is supplied with oil from a reservoir chamber 47a and the valve 48 has two way outlet connections to the air end of the cylinder 47 and to the top of the reservoir 47a. The air pressure gives a wide range of speed regulation for quick return, but the oil drive gives the best control. The speed of the stroke is manually adjusted by a control valve 55 in the connection between reservoir 47a and cylinder 47. The rack 46 carries a long adjustable side cam 49 which actuates a normally closed switch 51, a front cam 50 which actuates a normally closed limit switch 52, and a rear cam 54 which actuates a normally closed limit switch 53.

In operation, the units to be connected are brought into position with a depending tube end aligned in position to be gripped by the upper clamp 17, and an upstanding tube end in abutting relation to be gripped by the lower clamp 18. The operator turns the handles 27 which open the valves to supply air to the cylinders 24, which drive the wedges 23 between the arms 19 and 20 of each clamp, and causes the jaws of each clamp to grip the respective abutting tube ends. The handles 27 also actuate the interlock switches 28 in series with relay 62 to prevent movement of the rack 46 unless the jaws of both the upper and lower clamps 17 and 18 are closed.

When the clamp jaws are closed switches 28 being then closed, the machine operating sequence is started by momentarily depressing the start push button 60. This energizes relay 62 a second contact of which energizes the solenoid valve 48 for the rack 46. A fourth contact of relay 62 energizes the timer 64 that controls the argon valve 63 for the argon flow. A third contact of relay 62 also sets up the circuit for the welding contactors 66, but the welding contactors 66 will not be energized until the cam 54 moves off of the limit switch 53. Thus the arc is started after the torch is in motion.

As the rack 46 moves forward the torch 30 is rotated around the tube to be welded, the high welding current is turned on by the limit switch 53 when released from cam 54 and the timer 64 starts the argon flow. When the limit switch 51 is operated by cam 49 and held closed for at least one full revolution, the crater eliminator contactor 68 opens and the resistance 69 is placed in series with the arc, limiting the flow of current in the arc and reducing the crater size. The torch makes one revolution to complete the weld, another quarter revolution to decrease the size of the weld puddle, and still additional travel to decelerate the mechanism, a total of two revolutions.

As the rack 46 continues forward, limit switch 52 is opened by cam 50, which deenergizes relay 62 and returns the rack to its at rest position by deenergizing the solenoid rack valve 48 to return the valve to a position that admits air to the air end of the cylinder 47, the oil from the oil end of cylinder 47 being returned to the reservoir 47a. Argon continues to flow as set on the timer 64. The welded tubes are released from the jaws by operating the handles 27 for the upper and lower clamps 17 and 18.

We claim:

1. A method of butt welding tubular workpieces which comprises holding the workpieces with the tubular ends to be welded in abutting relation, applying substantially constant welding heat from a torch device to said abutted ends to form a weld puddle, the heat of welding advancing conductively in the direction of welding at a rate determined by the temperature, heat conductivity and thickness of said tubular ends, and revolving said torch device and thereby the weld puddle around the abutted tubular ends at a rate exceeding the said rate of conductive heat advance.

2. A method of butt welding tubular workpieces according to claim 1 in which the rate of revolution is such as to advance the weld puddle at a rate from 100 to more than 285 inches per minute.

3. Method of inert gas shielded electric arc tube butt welding with an electrode, which comprises holding the tube ends to be welded in abutted end-to-end relation, striking an arc between said electrode and said aligned abutted tube ends to form a weld puddle, shielding the arc and weld puddle with a stream containing essentially inert gas, after the arc is struck and weld puddle is formed continuing the arc at a constant power, the heat of welding advancing conductively at a rate determined by the temperature, heat conductivity and thickness of said tube ends, and revolving said electrode, arc, weld puddle and shielding gas stream around the abutted tube ends at a rate exceeding the rate of conductive heat advance.

4. Method of inert gas shielded electric arc tube butt welding with an electrode, which comprises holding the tube ends to be welded in abutted end-to-end relation, striking an arc between said electrode and said aligned abutted tube ends to form a weld puddle, shielding the arc and weld puddle with a stream containing essentially inert gas, and revolving said electrode, arc, weld puddle and shielding gas stream around the abutted tube ends at a rate from 100 to more than 285 inches per minute.

5. Method of inert gas shielded electric arc tube butt welding which comprises holding the tube ends to be welded in abutting end-to-end relation, revolving a torch carrying an electrode about the abutting tube ends at a rate from 100 to more than 285 inches per minute, striking an arc between the electrode and said aligned abutting tube ends after the torch is in motion, maintaining the arc for at least one revolution to complete the weld and continuing the revolution of the torch sufficient to decelerate the mechanism.

6. A method of inert gas shielded electric arc tube butt welding according to claim 5 in which said electrode is of the non-consumable type and the arc is maintained for one revolution to complete the weld and for about an additional one quarter revolution to decrease the size of the weld puddle, the revolution of the torch being continued thereafter to decelerate the mechanism within a total of about two revolutions.

7. Method of welding thin metal of wall thicknesses of 0.025 to 0.060 inch with a non-consumable electrode, which comprises holding the thin workpieces to be welded in abutted relation, striking an arc between said non-consumable electrode and said abutted thin workpieces to form a weld puddle, shielding the arc and weld puddle with a stream containing essentially inert gas, after the arc is struck and the weld puddle is formed continuing the arc at constant power, the heat of welding advancing conductively at a rate determined by the temperature, heat conductivity and thickness of the workpieces, and advancing said electrode, arc, weld puddle and shielding gas along the line of weld of said abutted thin workpieces at a rate exceeding the rate of conductive heat advance and between 100 and more than 285 inches per minute.

References Cited in the file of this patent

UNITED STATES PATENTS

| | | |
|---|---|---|
| 1,949,251 | Gilbert | Feb. 27, 1934 |
| 2,085,105 | Lex | June 29, 1937 |
| 2,721,248 | Kirkpatrick | Oct. 18, 1955 |